US012679982B2

(12) United States Patent
Jia et al.

(10) Patent No.: US 12,679,982 B2
(45) Date of Patent: Jul. 14, 2026

(54) INTUMESCENT FIRE-RETARDANT AND ANTI-CORROSIVE COATING MODIFIED BY POLYANILINE-SILICON CARBIDE AND PREPARATION METHOD THEREOF

(71) Applicant: China Academy of Machinery Wuhan Research Institute of Materials Protection Co. Ltd., Wuhan (CN)

(72) Inventors: Dan Jia, Wuhan (CN); Yijie Jin, Wuhan (CN); Haitao Duan, Wuhan (CN); Shengpeng Zhan, Wuhan (CN); Tian Yang, Wuhan (CN); Ao Chen, Wuhan (CN); Hualong Yu, Wuhan (CN); Lixin Ma, Wuhan (CN); Xiaoshuang Luo, Wuhan (CN)

(73) Assignee: China Academy of Machinery Wuhan Research Institute of Materials Protection Co. Ltd., Wuhan (CN)

( * ) Notice: Subject to any disclaimer, the term of this patent is extended or adjusted under 35 U.S.C. 154(b) by 240 days.

(21) Appl. No.: 18/751,369

(22) Filed: Jun. 24, 2024

(65) Prior Publication Data

US 2025/0145839 A1 May 8, 2025

(30) Foreign Application Priority Data

Nov. 8, 2023 (CN) .......................... 202311475899.8

(51) Int. Cl.
| | |
|---|---|
| *C09D 7/65* | (2018.01) |
| *C09D 5/02* | (2006.01) |
| *C09D 5/08* | (2006.01) |
| *C09D 5/18* | (2006.01) |
| *C09D 7/45* | (2018.01) |
| *C09D 7/61* | (2018.01) |
| *C09D 7/63* | (2018.01) |
| *C09D 163/00* | (2006.01) |

(52) U.S. Cl.
CPC .............. *C09D 5/185* (2013.01); *C09D 5/022* (2013.01); *C09D 5/027* (2013.01); *C09D 5/028* (2013.01); *C09D 5/086* (2013.01);

*C09D 7/45* (2018.01); *C09D 7/61* (2018.01); *C09D 7/63* (2018.01); *C09D 7/65* (2018.01); *C09D 163/00* (2013.01)

(58) Field of Classification Search
None
See application file for complete search history.

(56) References Cited

U.S. PATENT DOCUMENTS

2021/0284863 A1* 9/2021 Yang .................... C09D 163/00

FOREIGN PATENT DOCUMENTS

| CN | 105885042 A | 8/2016 | |
|---|---|---|---|
| CN | 112812296 A | 5/2021 | |
| CN | 114752184 A * | 7/2022 | ............. C08L 63/00 |
| EP | 3750935 A1 * | 12/2020 | ............. C08G 59/60 |

OTHER PUBLICATIONS

Tuo Biyang, Mineral Materials, Jun. 2023, pp. 106, Guizhou University Press, Guiyang, China.

* cited by examiner

*Primary Examiner* — Tanisha Diggs

(57) ABSTRACT

An intumescent fire-retardant and anti-corrosive coating modified by polyaniline-silicon carbide and a preparation method thereof are provided, the coating includes a compound A and a compound B. The compound A includes a waterborne epoxy resin emulsion, polyaniline-silicon carbide composite material, fire-retardant filler, titanium dioxide, aluminum hydroxide, talc powder, a wetting dispersant, a defoaming agent, a flow agent and water, the compound B includes an epoxy hardener. The polyaniline-silicon carbide composite material is prepared from silicon carbide, phenylamine, protonic acid and an oxidizing agent through an ice bath. The polyaniline-silicon carbide composite material can enhance dispersion in the emulsion through the organic-inorganic composite, and silicon carbide has high thermal stability and good density, while polyaniline serves as a material with unique fire-retardant properties. The synergy between the two effectively enhances the fire resistance and anti-corrosion performance of the coating, strengthens the strength of the intumescent layer, and solves existing problems.

7 Claims, 3 Drawing Sheets

INTUMESCENT FIRE-RETARDANT AND ANTI-CORROSIVE COATING MODIFIED BY POLYANILINE-SILICON CARBIDE AND PREPARATION METHOD THEREOF

TECHNICAL FIELD

The disclosure relates to the technical field of fire-retardant coatings, and particularly to an intumescent fire-retardant and anti-corrosive coating modified by polyaniline-silicon carbide and a preparation method thereof.

BACKGROUND

In environments such as substations, chemical plants, and factory buildings with steel structures, fire is a dangerous factor that can cause the collapse of steel structures, leading to major accidents. Currently, intumescent fire-retardant coatings are used to prevent the fire-induced collapse of steel structures that causes casualties and economic losses. However, the existing intumescent systems do not perform well in actual fire protection. This is mainly due to the fact that during a fire, the intumescent fire-retardant coating rapidly expands and produces gas quickly, which can only resist fiber fires for 10-20 minutes (min). When the surface of the intumescent fire-retardant coating continues to burn, there is a problem of large-area peeling. At the same time, the most critical issue is that the strength of the intumescent layer is very low and cannot prevent the rapid transfer of heat, leading to the intumescent layer being burned through and unable to resist the loss of strength in the steel structure. By utilizing the unique fire-retardant effect of polyaniline combined with the thermal stability of silicon carbide and its ability to fill gaps, a polyaniline-silicon carbide composite material is prepared. Further, an intumescent fire-retardant and anti-corrosive coating modified by polyaniline-silicon carbide is developed, achieving a high expansion strength and high expansion ratio of the coating, synergistically enhancing the fire-retardant property of the coating. This provides sufficient escape and rescue time for critical places and effectively ensures the reduction of casualties and economic losses.

SUMMARY

The purpose of the disclosure is to provide an intumescent fire-retardant and anti-corrosive coating modified by polyaniline-silicon carbide and a preparation method thereof. The polyaniline-silicon carbide composite material is prepared using silicon carbide, aniline, protonic acid, and oxidant, and further developed into an intumescent fire-retardant and anti-corrosive coating modified by the polyaniline-silicon carbide to enhance the fire-retardant property and anti-corrosion properties of the coating. The focus is to solve the problems of easy peeling of coatings due to the non-heat resistant anti-corrosive primer in traditional fire-retardant and anti-corrosive coatings, as well as the issues of low strength and poor density of fire-retardant coatings leading to the collapse of steel structures. This provides effective fire and anti-corrosion protection for important locations such as substations, chemical plants, and factory buildings. To achieve the above purpose, the technical scheme adopted by the disclosure is provided as follows.

Specifically, an intumescent fire-retardant and anti-corrosive coating modified by polyaniline-silicon carbide includes a waterborne epoxy resin emulsion, a polyaniline-silicon carbide composite material, a fire-retardant filler, titanium dioxide, aluminum hydroxide, talc powder, a wetting dispersant, a defoaming agent, a flow agent (also referred to as leveling agent), a film-forming additive, water and an epoxy hardener.

In an embodiment, the intumescent fire-retardant and anti-corrosive coating of modified polyaniline-silicon carbide specifically includes a compound A and a compound B. The compound A includes: 20-50 part of waterborne epoxy resin emulsion, 0.5-10 parts of polyaniline-silicon carbide composite material, 30-50 parts of fire-retardant filler, 1-5 parts of titanium dioxide, 1-5 parts of aluminum hydroxide, 1-5 parts of talc powder, 0.5-3 parts of wetting dispersant, 0.5-3 parts of defoaming agent, 0-3 parts of flow agent, 1-10 parts of film-forming additive and 0-10 parts of water. The compound B includes 5-15 parts of epoxy hardener. The parts by weight of the flow agent and the water are greater than 0.

In an embodiment, the waterborne epoxy resin emulsion includes at least one selected from the group consisting of bisphenol A waterborne epoxy resin emulsion, bisphenol F waterborne epoxy resin emulsion and acrylic-modified waterborne epoxy emulsion.

In an embodiment, the polyaniline-silicon carbide composite material is prepared from silicon carbide, phenylamine, protonic acid and an oxidizing agent as follows:

preparing a protonic acid aqueous solution using the protonic acid, putting the protonic acid aqueous solution in an ice-water mixture for ice bath, putting the silicon carbide and the phenylamine into the protonic acid aqueous solution to stir, thereby obtaining a reacted solution;

preparing an oxidizing agent aqueous solution using the oxidizing agent, adding the oxidizing agent aqueous solution into the reacted solution to stir and react for 1-2 hours (h), thereby obtaining a suspension; centrifuging and filtering the suspension to obtain a precipitate, washing the precipitate with deionized water, thereby obtaining the polyaniline-silicon carbide composite material.

In an embodiment, the oxidizing agent includes but are not limited to persulfate, hydrogen peroxide and ferric chloride.

In an embodiment, the protonic acid is any one of sulfuric acid, hydrochloric acid, and phosphoric acid, with a concentration of about 0.1-0.3 moles per liter, specifically, 0.2 moles.

In an embodiment, the fire-retardant filler includes an acid source filler, a carbon source filler and a gas source filler.

In an embodiment, the acid source filler includes at least one selected from the group consisting of ammonia polyphosphate, ammonium polyphosphate and ammonium phosphate, the carbon source filler includes at least one selected from the group consisting of pentaerythritol and dipentaerythritol, and the gas source filler includes at least one selected from the group consisting of melamine and dicyandiamide.

In an embodiment, the flow agent is a polyether-modified organ polysiloxane flow agent. For example, the Rian-Pont2903 produced by Sichuan Rui Kaibang Chemical Materials Co., Ltd. can be used as the flow agent.

In an embodiment, the defoaming agent is emulsified polysiloxane.

In an embodiment, the wetting dispersant is a nonionic surfactant, which includes alkyl phenyl polyoxyethylene ether, softener SG, coconut amine polyoxyethylene ether and polyether macromolecular compound.

In an embodiment, the epoxy hardener is an amine hardener.

In an embodiment, the film-forming additive includes at least one selected from the group consisting of 1-Methoxy-2-propanol (also referred to as propylene glycol methyl ether), 2-methyl-2,4-pentanediol (also referred to as hexanediol), and 2-ethoxyethanol (also referred to as ethylene glycol ethyl ether).

A preparation method of an intumescent fire-retardant and anti-corrosive coating modified by polyaniline-silicon carbide is also provided and includes steps as follows:

mixing 20-50 parts by weight of waterborne epoxy resin emulsion, 0.5-10 parts by weight of polyaniline-silicon carbide composite material, 30-50 parts by weight of fire-retardant filler, 1-5 parts by weight of titanium dioxide, 1-5 parts by weight of aluminum hydroxide, 1-5 parts by weight of talc powder, 0.5-3 parts by weight of wetting dispersant, 0.5-3 parts by weight in a half of defoaming agent, 0-3 parts by weight of flow agent, 1-10 parts by weight in a half of film-forming additive and 0-10 parts by weight of water to obtain a mixed solution, stirring the mixed solution at a speed of 2000-3000 revolutions per minute (r/min) and dispersing for 15-30 minutes (min) to obtain a reacted solution;

supplementing the film-forming agent and the defoaming agent once each into the reacted solution to stir at a speed of 1000-1500 r/min for 8-14 min, thereby obtaining a compound A;

mixing an amine hardener to obtain a compound B; and mixing the compound A and the compound B to obtain the intumescent fire-retardant coating modified by polyaniline-silicon carbide.

After coating, the dry film thickness of the coated sample is 3 millimeters (mm).

The principle of the disclosure is as follows.

The disclosure uses a waterborne epoxy resin emulsion as the main film-forming material, which is characterized by being non-toxic, odorless, and having excellent adhesive properties. At the same time, the polyaniline-silicon carbide composite material is prepared using an ice bath method, fully leveraging the high thermal stability, good density of silicon carbide, and the unique fire-retardant and anti-corrosion effects of polyaniline, to synergistically enhance the density, thermal stability, and intumescent layer strength of the coating material. Finally, by combining the fire-retardant properties and filling abilities of materials such as titanium dioxide, aluminum hydroxide, and talc, it provides excellent anti-corrosion performance before a fire occurs and efficient fire-retardant performance during a fire emergency, ensuring the safety of life and property.

The beneficial effects of the disclosure are as follows.

1. The intumescent fire-retardant and anti-corrosive coating modified by polyaniline-silicon carbide prepared by the disclosure uses a waterborne epoxy resin emulsion as the base material, and fillers such as polyaniline-silicon carbide composite material, titanium dioxide, aluminum hydroxide, and talc. The main intumescent fillers include acid sources, carbon sources, and gas sources, which are characterized by high density, good corrosion resistance, stable intumescent layer, and prolonged fire-retardant time.

2. The polyaniline-silicon carbide composite material prepared in the disclosure utilizes the excellent thermal stability of silicon carbide flake, its barrier effect against corrosive media, and the unique fire-retardant and anti-corrosion capabilities of polyaniline. The combination of these two materials achieves the integration of organic-inorganic materials, significantly enhancing the density, corrosion resistance, intumescent layer strength, and fire-retardant property and thermal insulation performance of the coating. It synergistically addresses the challenges faced by fire-retardant coatings, such as insufficient fire and corrosion resistance, susceptibility to peeling, and easy burning through, breaking through the formulation system and preparation technology of integrated fire-retardant and anti-corrosive coating materials.

DETAILED DESCRIPTION OF EMBODIMENTS

In order to better understand the disclosure, the following will provide a clear and complete description and explanation of the specific technical solution of an intumescent fire-retardant and anti-corrosive coating of modified polyaniline-silicon carbide and a preparation method thereof based on the disclosure, combined with the embodiments and attached drawings. However, this cannot limit the scope of protection and implementation of the disclosure.

An intumescent fire-retardant and anti-corrosive coating of modified polyaniline-silicon carbide and a preparation method thereof are provided as follows.

Embodiment 1

(a) 1 liter (L) of a hydrochloric acid aqueous solution with a concentration of 0.2 moles per liter (M) is prepared, the hydrochloric acid aqueous solution is placed in an ice-water mixture for ice bath, after the ice bath, 9.1 milliliters (mL) of polyaniline monomer (aniline) and 4.0 grams (g) of silicon carbide are added into the hydrochloric acid aqueous solution to continuously stir and disperse evenly, thereby to obtain a reaction solution.

Figure 1:
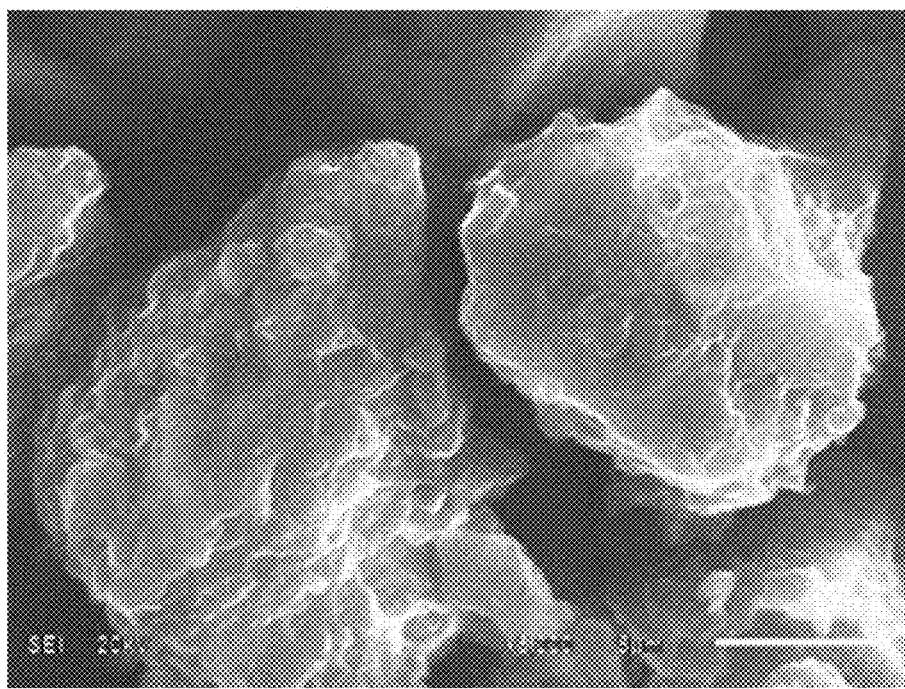
FIG. 1 illustrates a scanning electron microscope (SEM) diagram of a polyaniline-silicon carbide composite material.

(b) 200 mL of an ammonium persulfate oxidant aqueous solution with a concentration of 0.5 M is prepared, then the ammonium persulfate oxidant aqueous solution is slowly added into the reaction solution obtained by the step (a) to stir and react for 1-2 h, thereby obtaining a suspension; the suspension is centrifuged and filtered to obtain a precipitate, followed by washing the precipitate with deionized water, thereby obtaining a polyaniline-silicon carbide composite material. The polyaniline-silicon carbide composite material is characterized by scanning electron microscope (SEM) diagram as shown in FIG. 1.

(c) 50 parts by weight of waterborne epoxy resin emulsion, 7 parts by weight of polyaniline-silicon carbide composite material, 44 parts by weight of fire-retardant filler, 4 parts by weight of titanium dioxide, 3 parts by weight of aluminum hydroxide, 5 parts by weight of talc powder, 2 parts by weight of wetting dispersant, 1 part by weight of defoaming agent, 1 part by weight of flow agent, 3 parts by weight of film-forming additive, and 5 parts by weight of water are mixed to obtain a mixed solution, followed by stirring the mixed solution at a speed of 2000-3000 revolutions per minute (r/min) and dispersing for 25 minutes (min) to obtain a reacted solution.

(d) The film-forming agent (3 parts by weight) and the defoaming agent (1 part by weight) are supplemented once each into the reacted solution to stir at a speed of 1000-1500 r/min for 10 min, thereby obtaining a compound A.

Figure 2:
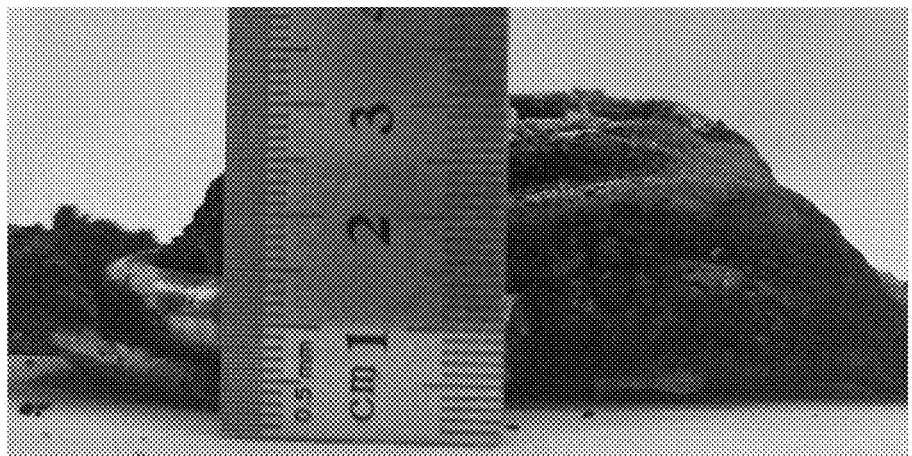
FIG. 2 illustrates a morphology of an intumescent fire-retardant and anti-corrosive coating obtained from an embodiment 1 after 2 hours of combustion.
Figure 5A:
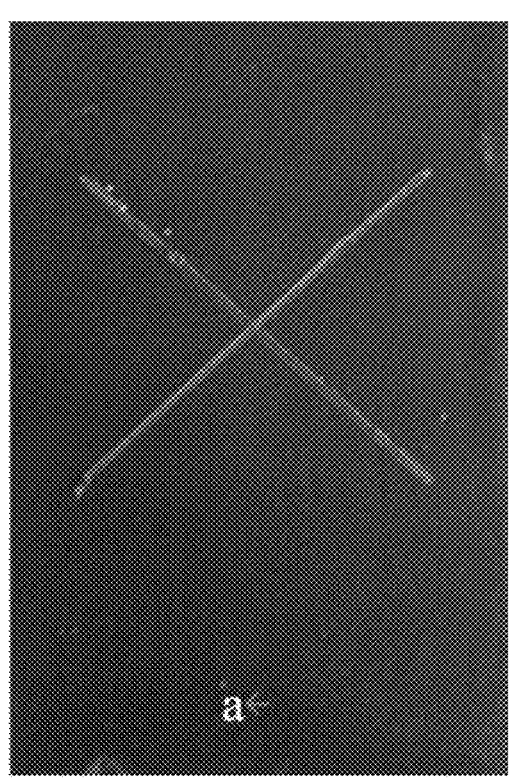
FIG. 5A illustrates a comparison diagram of an intumescent layer of the intumescent fire-retardant and anti-corrosive coating obtained from the embodiment 1 before a 192-h salt spray test.
Figure 5B:
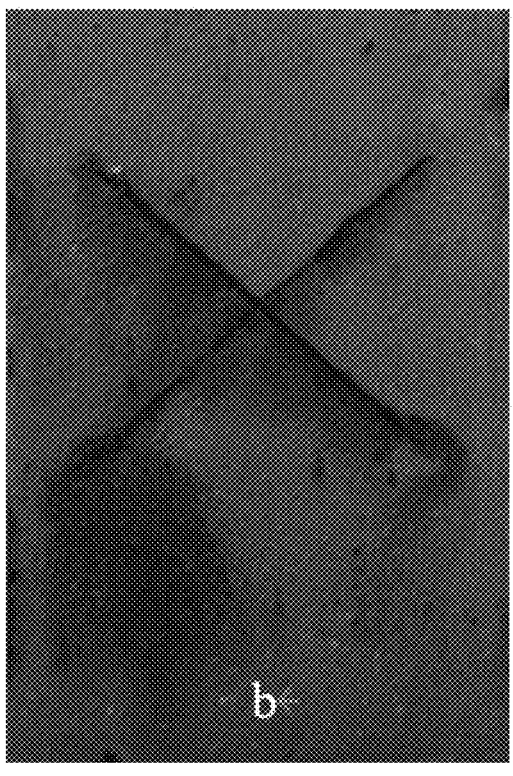
FIG. 5B illustrates a comparison diagram of the intumescent layer of the intumescent fire-retardant and anti-corrosive coating obtained from the embodiment 1 after the 192-h salt spray test.

(e) The compound A and 10 parts by weight of amine hardener as a compound B are mixed to obtain the intumescent fire-retardant coating modified by the polyaniline-silicon carbide for coating. After the coating, the dry film thickness of the coated sample is 3 millimeters (mm), the coated sample is subjected to a 1.5-hour burning test, and the result is shown in FIG. 2. The compressive strength test result for the coated sample is shown in FIGS. 5A and 5B.

Embodiment 2

(a) 1 L of a hydrochloric acid aqueous solution with a concentration of 0.2 moles per liter is prepared, the hydrochloric acid aqueous solution is placed in an ice-water mixture for ice bath, after the ice bath, 9.1 mL of polyaniline monomer and 4.0 g of silicon carbide are added into the hydrochloric acid aqueous solution to continuously stir and disperse evenly, thereby to obtain a reaction solution.

(b) 200 mL of an ammonium persulfate oxidant aqueous solution with a concentration of 0.5 M is prepared, then the ammonium persulfate oxidant aqueous solution is slowly added into the reaction solution obtained by the step (a) to stir and react for 1-2 h, thereby obtaining a suspension; the suspension is centrifuged and filtered to obtain a precipitate, followed by washing the precipitate with deionized water, thereby obtaining a polyaniline-silicon carbide composite material.

(c) 50 parts by weight of a waterborne epoxy resin emulsion, 10 parts by weight of a polyaniline-silicon carbide composite material, 37 parts by weight of a fire-retardant filler, 5 parts by weight of titanium dioxide, 5 parts by weight of aluminum hydroxide, 3 parts by weight of talc powder, 2 parts by weight of a wetting dispersant, 1 part by weight of a defoaming agent, 2 parts by weight of a flow agent, 3 parts by weight of a film-forming additive and 7 parts by weight of water are mixed to obtain a mixed solution, followed by stirring the mixed solution at a speed of 2000-3000 r/min and dispersing for 25 min to obtain a reacted solution.

(d) The film-forming agent (3 parts by weight) and the defoaming agent (1 part by weight) are supplemented once each into the reacted solution to stir at a speed of 1000-1500 r/min for 10 min, thereby obtaining a compound A.

(e) the compound A and 8 parts by weight of an amine hardener as a compound B are mixed to obtain the intumescent fire-retardant coating modified by polyaniline-silicon carbide for coating. After the coating, the dry film thickness of the coated sample is 3 mm.

Embodiment 3

(a) 1 L of a hydrochloric acid aqueous solution with a concentration of 0.2 moles per liter is prepared, the hydrochloric acid aqueous solution is placed in an ice-water mixture for ice bath, after the ice bath, 9.1 mL of polyaniline monomer and 4.0 g of silicon carbide are added into the hydrochloric acid aqueous solution to continuously stir and disperse evenly, thereby to obtain a reaction solution.

(b) 200 mL of an ammonium persulfate oxidant aqueous solution with a concentration of 0.5 M is prepared, then the ammonium persulfate oxidant aqueous solution is slowly added into the reaction solution obtained by the step (a) to stir and react for 1-2 h, thereby obtaining a suspension; the suspension is centrifuged and filtered to obtain a precipitate, followed by washing the precipitate with deionized water, thereby obtaining a polyaniline-silicon carbide composite material.

(c) 45 parts by weight of a waterborne epoxy resin emulsion, 7 parts by weight of a polyaniline-silicon carbide composite material, 40 parts by weight of a fire-retardant filler, 2 parts by weight of titanium dioxide, 2 parts by weight of aluminum hydroxide, 4 parts by weight of talc powder, 3 parts by weight of a wetting dispersant, 2 parts by weight of a defoaming agent, 3 parts by weight of a flow agent, 3 parts by weight of a film-forming additive and 7 parts by weight of water are mixed to obtain a mixed solution, followed by stirring the mixed solution at a speed of 2000-3000 r/min and dispersing for 25 min to obtain a reacted solution.

(d) The film-forming agent (3 parts by weight) and the defoaming agent (1 part by weight) are supplemented once each into the reacted solution to stir at a speed of 1000-1500 r/min for 10 min, thereby obtaining a compound A.

(e) the compound A and 8 parts by weight of an amine hardener as a compound B are mixed to obtain the intumescent fire-retardant coating modified by polyaniline-silicon carbide for coating. After the coating, the dry film thickness of the coated sample is 3 mm.

Figure 3:
FIG. 3 illustrates a morphology of an intumescent fire-retardant and anti-corrosive coating obtained from an embodiment 2 after 2 hours of the combustion.
Figure 4:
FIG. 4 illustrates a morphology of an intumescent fire-retardant and anti-corrosive coating obtained from an embodiment 3 after 2 hours of the combustion.
Figure 6:
FIG. 6 illustrates a compressive strength of the intumescent fire-retardant and anti-corrosive coating obtained from an embodiment 1.

The polyaniline-silicon carbide composite material in the embodiment 1 of the disclosure is observed by SEM, showing that polyaniline is attached to the surface of silicon carbide particles (as shown in FIG. 1), which effectively enhances the compatibility and dispersibility of the silicon carbide in the resin. Large panel experiments are conducted on the coated samples of the embodiments 1-3, and their expansion photos are shown in FIGS. 2-4, respectively, with expansion ratios of 10 times, 7 times, and 7 times, respectively. FIGS. 5A and 5B show the salt spray test for the corrosion resistance of the coating in the embodiment 1, and no obvious corrosion phenomenon is observed at the scratch of the coating after 192 hours of testing. The compressive strength test of the intumescent layer is shown in FIG. 6, and it can be seen that under the weight of a 2.5 kilograms (kg) weight, the intumescent layer remains intact, indicating that the strength of the intumescent layer is excellent. In summary, the polyaniline-silicon carbide fully combines the fire-retardant performance of polyaniline and the heat insulation performance of silicon carbide, synergistically enhancing the density, corrosion resistance, expansion effect, and compressive strength of the intumescent layer of the coating. It also promotes the formation of a dense intumescent layer on its surface, providing good heat insulation effect against fire.

It must be noted that the above is only intended to better illustrate the disclosure and is not intended to limit the disclosure. Those skilled in the art should understand that any simplification, combination, replacement, or other modification made within the spirit and principles of the disclosure should be included within the scope of protection of the disclosure.

What is claimed is:

1. An intumescent fire-retardant and anti-corrosive coating modified by polyaniline-silicon carbide, made from the following components in parts by weight:

a compound A, comprising: 20-50 parts of waterborne epoxy resin emulsion, 0.5-10 parts of polyaniline-silicon carbide composite material, 35-50 parts of fire-retardant filler, 1-5 parts of titanium dioxide, 1-5 parts of aluminum hydroxide, 1-5 parts of talc powder, 0.5-3 parts of wetting dispersant, 0.5-3 parts of defoaming agent, 0-3 parts of flow agent, 1-10 parts of film-forming additive and 0-10 parts of water; and a compound B, comprising 5-15 parts of epoxy hardener;

wherein the parts by weight of the flow agent and the water are greater than 0;

wherein the waterborne epoxy resin emulsion comprises at least one selected from the group consisting of bisphenol A waterborne epoxy resin emulsion, bisphenol F waterborne epoxy resin emulsion, and acrylic-modified waterborne epoxy emulsion;

wherein the polyaniline-silicon carbide composite material is prepared as follows:

preparing a protonic acid aqueous solution using the protonic acid, putting the protonic acid aqueous solution in an ice-water mixture for ice bath, putting the silicon carbide and the phenylamine into the protonic acid aqueous solution to stir, thereby obtaining a reaction solution; and preparing an oxidizing agent aqueous solution using the oxidizing agent, adding the oxidizing agent aqueous solution into the reaction solution to stir and react for 1-2 hours (h), thereby obtaining a suspension; centrifuging and filtering the suspension to obtain a precipitate, washing the precipitate with deionized water, thereby obtaining the polyaniline-silicon carbide composite material;

wherein the protonic acid aqueous solution is selected from the group consisting of sulfuric acid, hydrochloric acid and phosphoric acid, with a concentration of 0.1-0.3 Molar (M);

wherein the fire-retardant filler comprises an acid source filler, a carbon source filler and a gas source filler; and wherein the acid source filler comprises at least one selected from the group consisting of ammonia polyphosphate, and ammonium phosphate; the carbon source filler comprises at least one selected from the group consisting of pentaerythritol and dipentaerythritol; and the gas source filler comprises at least one selected from the group consisting of melamine and dicyandiamide.

2. The intumescent fire-retardant and anti-corrosive coating modified by the polyaniline-silicon carbide as claimed in claim 1, wherein the flow agent is a polyether-modified silicone flow agent.

3. The intumescent fire-retardant and anti-corrosive coating modified by the polyaniline-silicon carbide as claimed in claim 1, wherein the defoaming agent is emulsified polysiloxane.

4. The intumescent fire-retardant and anti-corrosive coating modified by the polyaniline-silicon carbide as claimed in claim 1, wherein the wetting dispersant is a nonionic surfactant.

5. The intumescent fire-retardant and anti-corrosive coating modified by the polyaniline-silicon carbide as claimed in claim 1, wherein the epoxy hardener is an amine hardener.

6. The intumescent fire-retardant and anti-corrosive coating modified by the polyaniline-silicon carbide as claimed in claim 1, wherein the film-forming additive comprises at least one selected from the group consisting of 1-Methoxy-2-propanol, 2-methyl-2,4-pentanediol, and 2-ethoxyethanol.

7. A preparation method of the intumescent fire-retardant and anti-corrosive coating modified by the polyaniline-silicon carbide as claimed in claim 1, comprising:

mixing the 20-50 parts by weight of the waterborne epoxy resin emulsion, the 0.5-10 parts by weight of the polyaniline-silicon carbide composite material, the 35-50 parts by weight of the fire-retardant filler, the 1-5 parts by weight of the titanium dioxide, the 1-5 parts by weight of the aluminum hydroxide, the 1-5 parts by weight of the talc powder, the 0.5-3 parts by weight of the wetting dispersant, the 0.5-3 parts by weight in a half of the defoaming agent, the 0-3 parts by weight of the flow agent, the 1-10 parts by weight in a half of the film-forming additive and the 0-10 parts by weight of the water to obtain a mixed solution, stirring the mixed solution at a speed of 2000-3000 revolutions per minute (r/min) and dispersing for 15-30 minutes (min) to obtain a reacted solution;

supplementing the film-forming additive and the defoaming agent once each into the reacted solution to stir at a speed of 1000-1500 r/min for 8-14 min, thereby obtaining a compound A;

mixing an amine hardener to obtain the compound B; and mixing the compound A and the compound B to obtain the intumescent fire-retardant coating modified by the polyaniline-silicon carbide.

* * * * *